(12) United States Patent
Cheng

(10) Patent No.: US 6,810,830 B1
(45) Date of Patent: *Nov. 2, 2004

(54) WATER STOPPING STRUCTURE OF A SPOUT OF A DRINKING FOUNTAIN FOR A PET

(76) Inventor: Chen Hui Cheng, No. 172, Lun-Mei Rd., Chang Hua City, Chang Hua Hsien (TW)

(*) Notice: Subject to any disclaimer, the term of this patent is extended or adjusted under 35 U.S.C. 154(b) by 0 days.

This patent is subject to a terminal disclaimer.

(21) Appl. No.: 10/459,211

(22) Filed: Jun. 12, 2003

(51) Int. Cl.[7] .................................................. A01K 7/00
(52) U.S. Cl. ..................................................... 119/72.5
(58) Field of Search .................. 119/72.5, 72, 51.5, 119/464, 475; 251/339, 354

(56) References Cited

U.S. PATENT DOCUMENTS

| 3,602,197 | A | * | 8/1971 | Fioretto | 119/72.5 |
|---|---|---|---|---|---|
| 4,589,373 | A | * | 5/1986 | Hostetler et al. | 119/72.5 |
| 5,301,635 | A | * | 4/1994 | Rovira Badia et al. | 119/72.5 |
| 6,553,937 | B1 | * | 4/2003 | Cheng | 119/72.5 |
| 6,561,129 | B1 | * | 5/2003 | Cheng | 119/72.5 |
| 2003/0233986 | A1 | * | 12/2003 | Pappas et al. | 119/72.5 |

* cited by examiner

Primary Examiner—Yvonne R. Abbott
(74) Attorney, Agent, or Firm—Harrison & Egbert

(57) ABSTRACT

A pet fountain includes a spout projecting from a reservoir, and a tap fastened at one end to the spout and provided at the other end with an opening via which a flow of water is discharged. The tap is provided with a steel ball space in communication with the spout and the opening, and a washer retained in a groove located in proximity of the opening, and a guide edge located between the groove and the steel ball space. A steel ball is movably disposed in the steel ball space such that the steel ball comes in contact with the washer, and such that the steel ball is partially extended out of the opening. The guide edge serves to prevent the steel ball from being inseparably arrested by the washer. The guide edge has a predetermined height which determines the rate of the flow of water discharged via the opening.

2 Claims, 8 Drawing Sheets

US 6,810,830 B1

WATER STOPPING STRUCTURE OF A SPOUT OF A DRINKING FOUNTAIN FOR A PET

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a drinking fountain for pet, and more particularly to a water stopping structure of the spout of the drinking fountain for pet.

BACKGROUND OF THE INVENTION

As shown in FIG. 9, a prior art spout 50 of the drinking fountain for pet is provided at the free end with a tapping part 51 fastened therewith. The tapping part 51 is provided at the free end with an opening 52 via which the drinking water is discharged. The tapping part 51 is provided in the inner wall of the free end thereof with a washer 53 and a steel ball 54. The opening 52 of the tapping part 51 is shut off by the steel ball 54 at the time when the steel ball 54 comes in a full contact with the washer 53. As a result, the flow of the drinking water is stopped by the steel ball 54. When the steel ball 54 is moved away from the washer 53 by the licking tongue of a pet, the opening 52 is no longer obstructed by the steel ball 54, thereby allowing the passage of the drinking water. As soon as the licking tongue of the pet withdraws from the steel ball 54, the steel ball 54 drops back into the washer 53 so as to shut off the opening 52. Such a water stopping structure of the prior art as described above is defective in design in that the washer 53 is not securely located and is therefore vulnerable to displacement by the licking tongue of the pet. The displacement of the washer 53 is bound to result in water leak.

As shown in FIG. 10, an improved version of the prior art structure described above with reference to FIG. 9 is provided in the inner wall of the tapping part 51 with a projection 55 which is used to arrest the washer 53 so as to prevent the washer 53 from being displaced by the licking tongue of a pet. In light of the spout 50 and the tapping part 51 being located slantingly, the steel ball 54 is prone to being caught by the projection 55 in the wake of the withdrawal of the licking tongue of the pet. The failure of the steel ball 54 to return to its original position results in water leak.

As shown in FIG. 11, another prior art tapping part 62 is fastened to the free end of a spout 61 of a pet fountain. The tapping part 62 is provided in the inner wall with an upper tapered portion 621, and a lower tapered portion 622 which is provided with an upper stop edge 623 and a lower stop edge 625. A tapered washer 63 is held securely in the lower tapered portion 622. However, both the tapered washer 63 and the lower tapered portion 622 must be made with precision at additional cost. In addition, a steel ball 64 is bound to be forced by the water pressure to sit tightly in the washer 63, thereby making it difficult for the tongue of a pet to move the steel ball 64 by licking. Such a difficulty is particularly acute for a pet with a small tongue.

BRIEF SUMMARY OF THE INVENTION

The primary objective of the present invention is to provide a pet fountain with a spout structure free of the deficiencies of the prior art structures described above.

The foregoing objective of the present invention is attained by a spout structure comprising a spout projecting from the main body of a pet fountain, and a tapping part fastened at one end to the free end of the spout. The tapping part is provided in the interior with a steel ball space of a tapered construction, and in the inner wall of other end thereof with a groove for retaining a washer. The steel ball is movably received in the steel ball space such that the steel ball is partially extended out of the other end of the tapping part. When the steel ball is moved by the licking tongue of a pet, the drinking water is let out of the other end of the tapping part via a gap which is formed between the inner wall of the steel ball space and the steel ball in motion. The tapping part is provided with a guide edge to prevent the steel ball from sitting snugly in the washer.

The features and the advantages of the present invention will be more readily understood upon a thoughtful deliberation of the following detailed description of the preferred embodiments of the present invention with reference to the accompanying drawings.

DETAILED DESCRIPTION OF THE INVENTION

Figure 1:
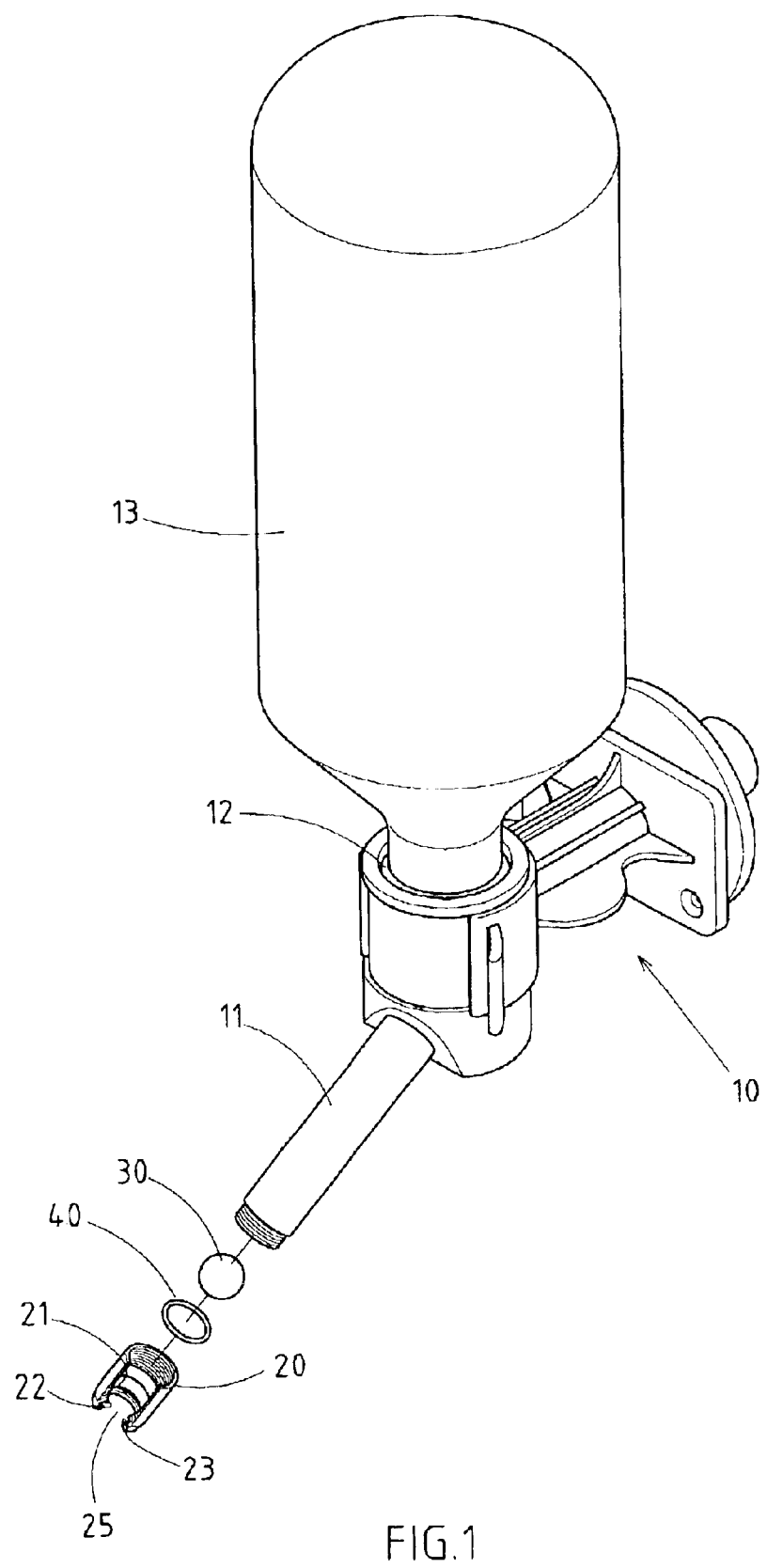
FIG. 1 shows an exploded perspective view of a first preferred embodiment of the present invention.
Figure 2:
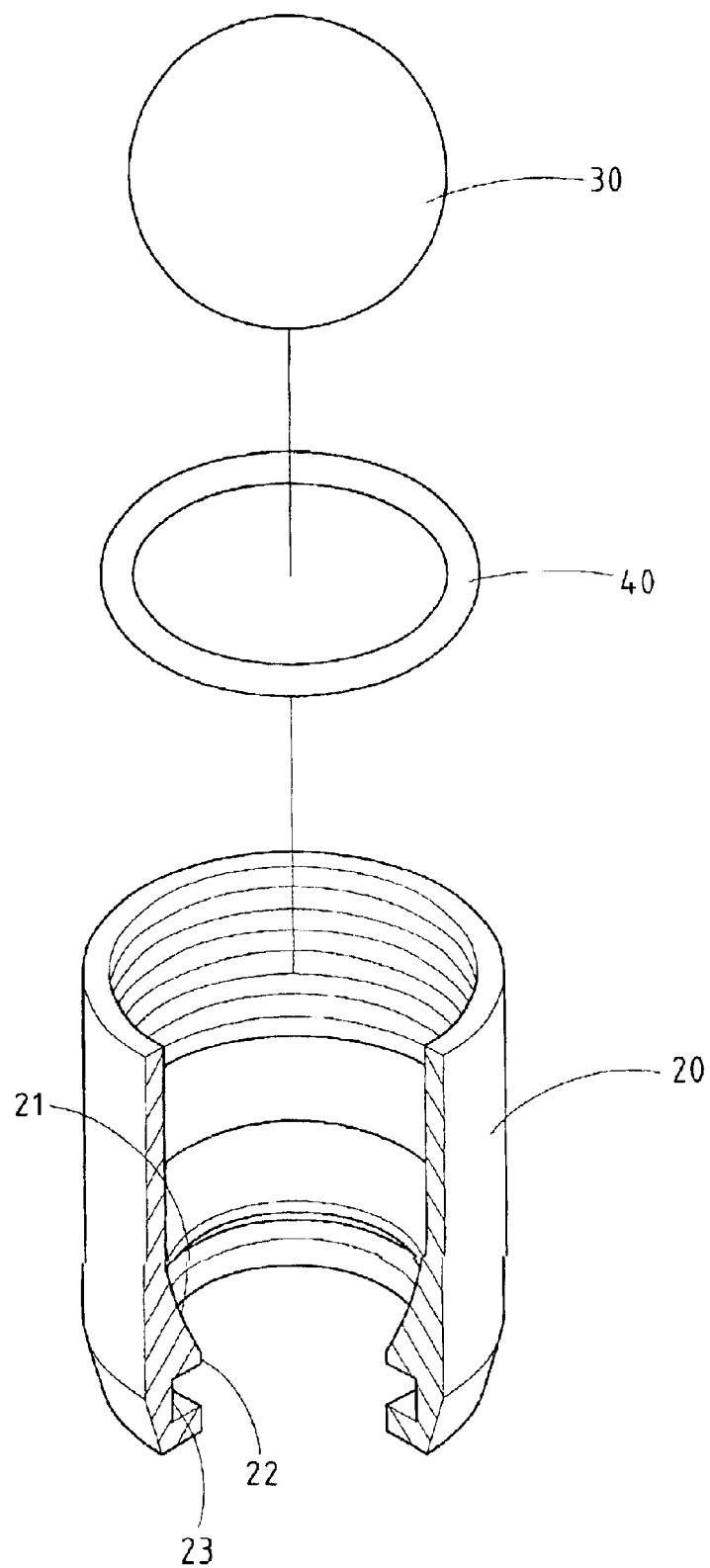
FIG. 2 shows an enlarged exploded perspective view of the first preferred embodiment of the present invention.
Figure 3:
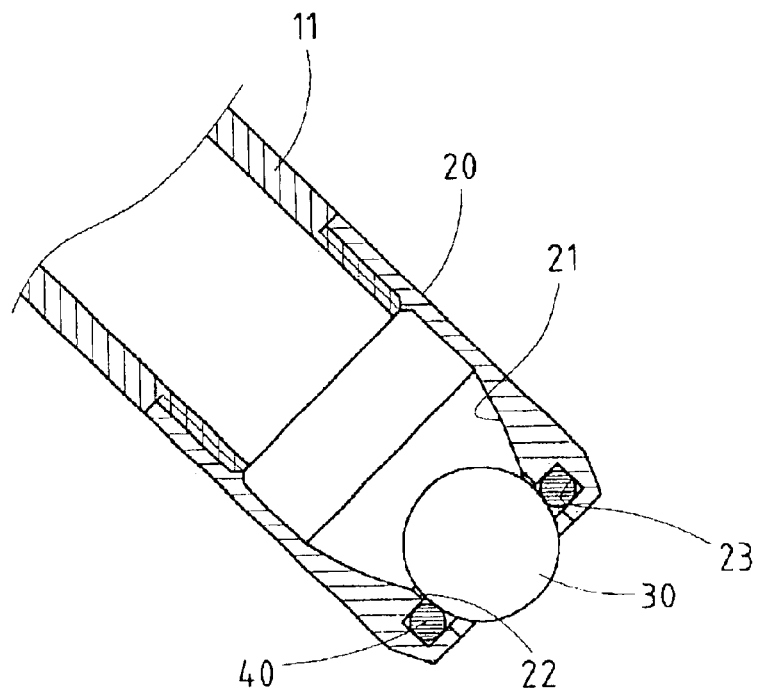
FIG. 3 shows a longitudinal sectional view of the first preferred embodiment of the present invention.

As shown in FIGS. 1–3, a pet fountain 10 embodied in the present invention comprises a water reservoir 13, a neck 12, and a spout 11.

Figure 4:
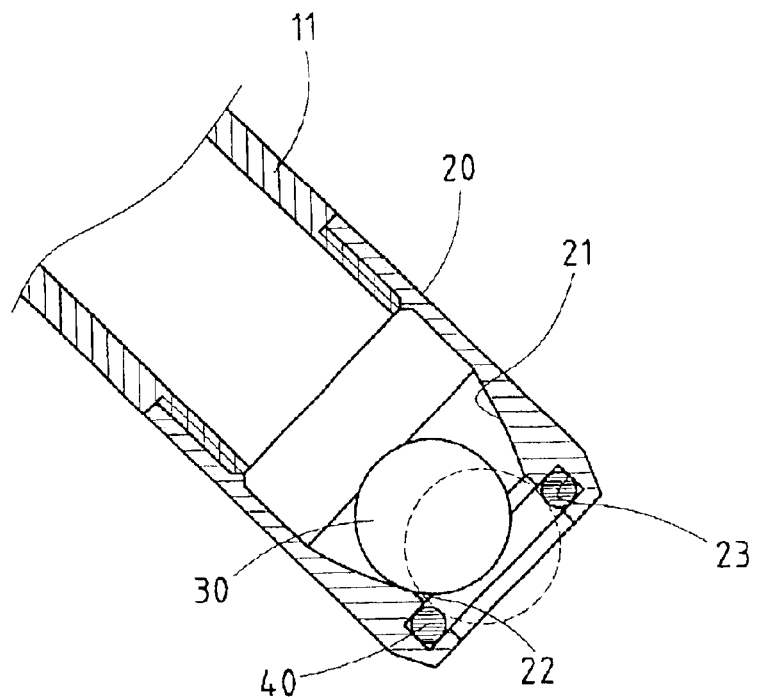
FIG. 4 shows a longitudinal sectional view of the first preferred embodiment of the present invention at work.

The spout 11 is provided at the free end with a tap 20 fastened therewith. The tap 20 is of a tubular construction and is provided in the interior with a steel ball space 21 in communication with the spout 11. The tap 20 is provided at the free end with an opening 25 in communication with the steel ball space 21 which is tapered in a direction toward the opening 25. The tap 20 is provided in the inner wall with a groove 23 which is located in proximity of the opening 25 and is used to retain a washer 40. The tap 20 is further provided with a guide edge 22 extending from the bottom edge of the steel ball space 21. In another words, the guide edge 22 is located between the steel ball space 21 and the groove 23. A steel ball 30 is movably disposed in the steel ball space 21 such that the steel ball 30 is stopped by the guide edge 22, and that the steel ball 30 is partially extended out of the opening 25. In the meantime, the steel ball 30 comes in contact with the washer 40, as shown in FIG. 3. When the steel ball 30 is moved further into the steel ball space 21 by the licking tongue of a pet, there is a gap between the steel ball 30 and the guide edge 22. As a result, the water is let out of the opening 25 through the gap, as illustrated in FIG. 4. As soon as the pet withdraws its tongue from the steel ball 30, the steel ball 30 drops back to its original position in which the steel ball 30 is stopped by the guide edge 22 as well as the washer 40, as shown in FIG. 3. As a result, the flow of water is stopped. The guide edge 22 serves to prevent the steel ball 30 from sitting snugly in the washer 40.

Figure 5:
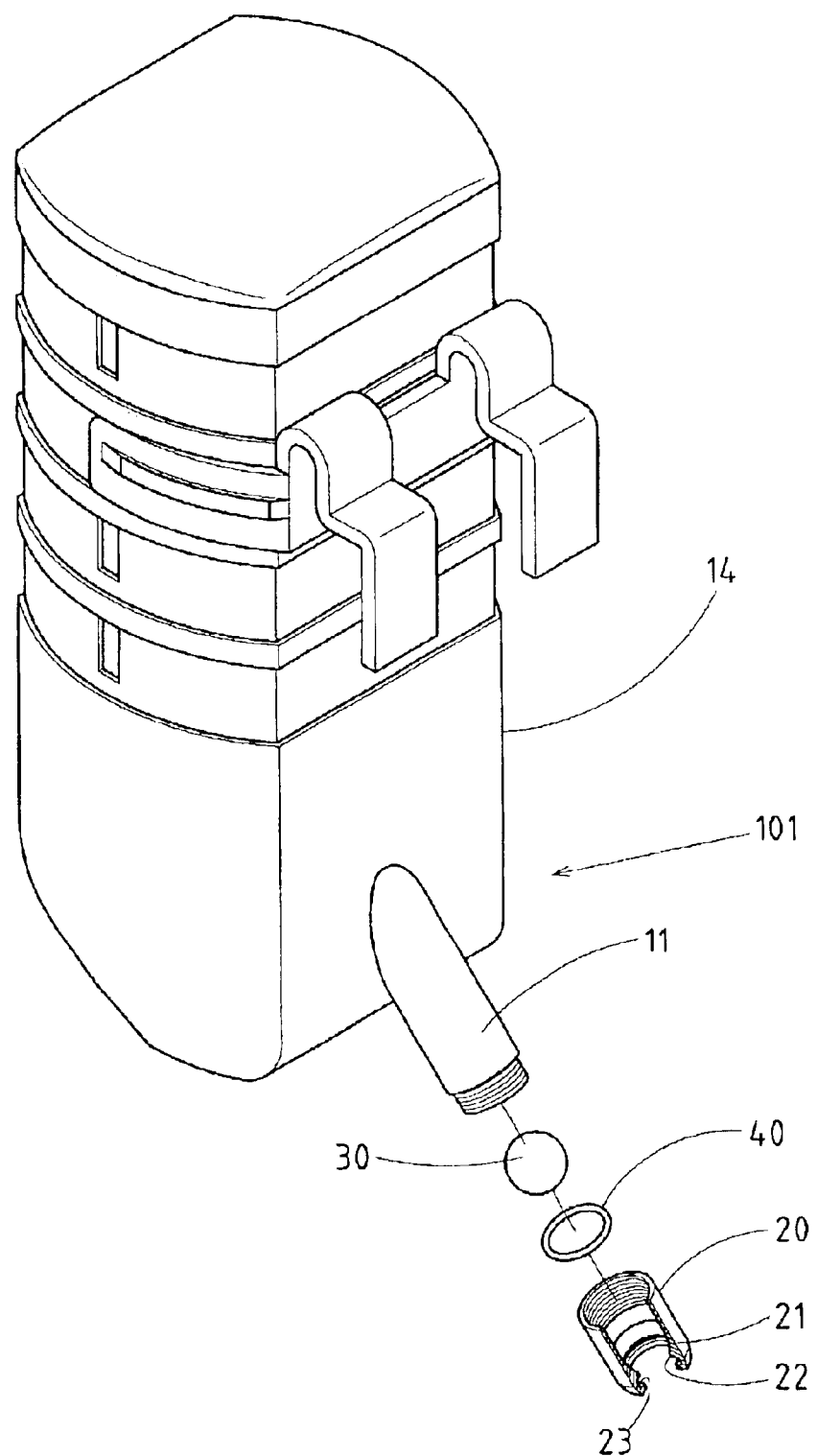
FIG. 5 shows an exploded perspective view of a second preferred embodiment of the present invention.
Figure 6:
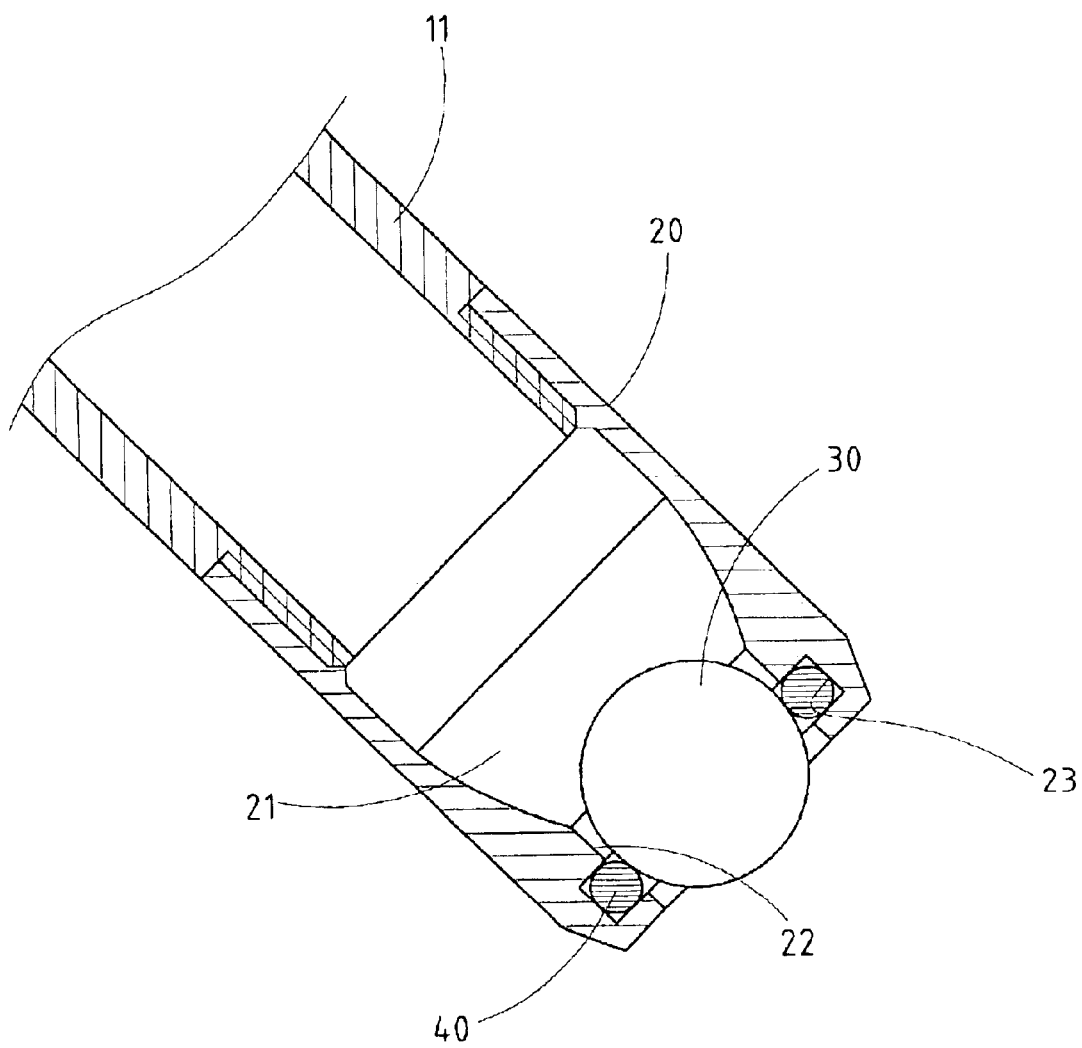
FIG. 6 shows a longitudinal sectional view of the second preferred embodiment of the present invention.

As shown in FIGS. 5 and 6, a pet fountain 101 embodied in the present invention comprises a reservoir 14, a spout 11 extending from the reservoir 14, and a tap 20 fastened to the free end of the spout 11 for starting or stopping the flow of water.

Figure 7:
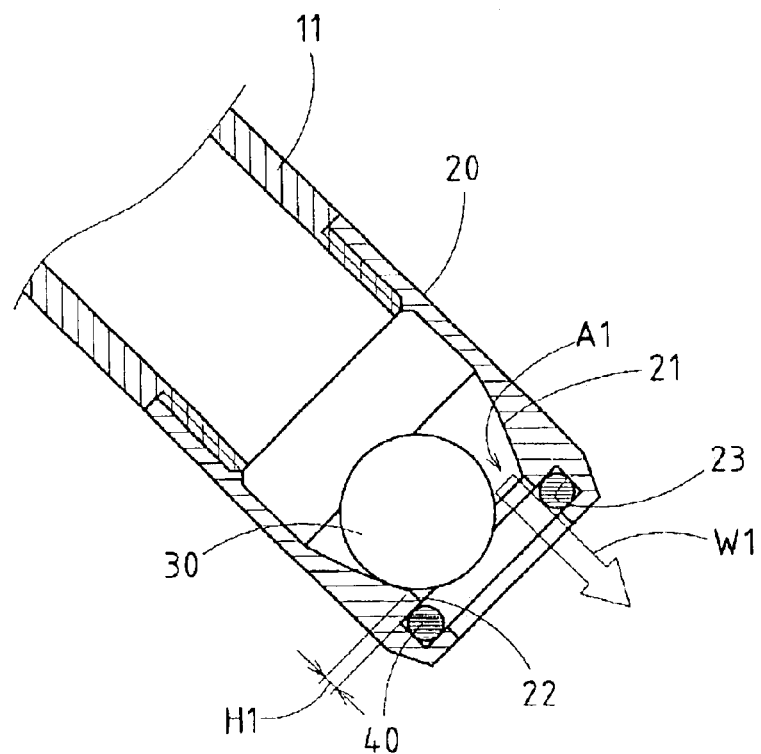
FIG. 7 shows a longitudinal sectional view of the second preferred embodiment of the present invention at work.
Figure 8:
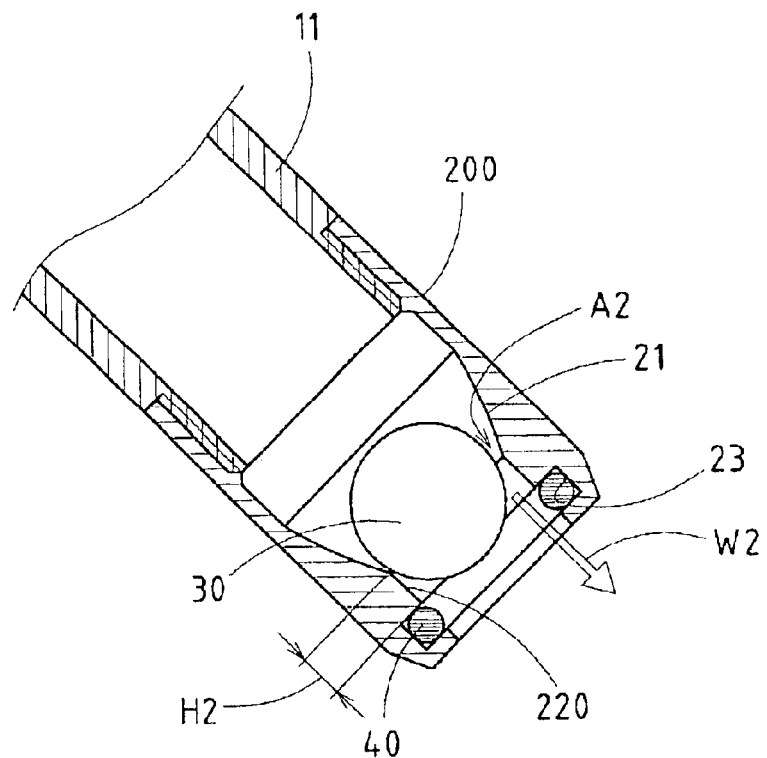
FIG. 8 shows a longitudinal sectional view of a third preferred embodiment of the present invention at work.
Figure 9:
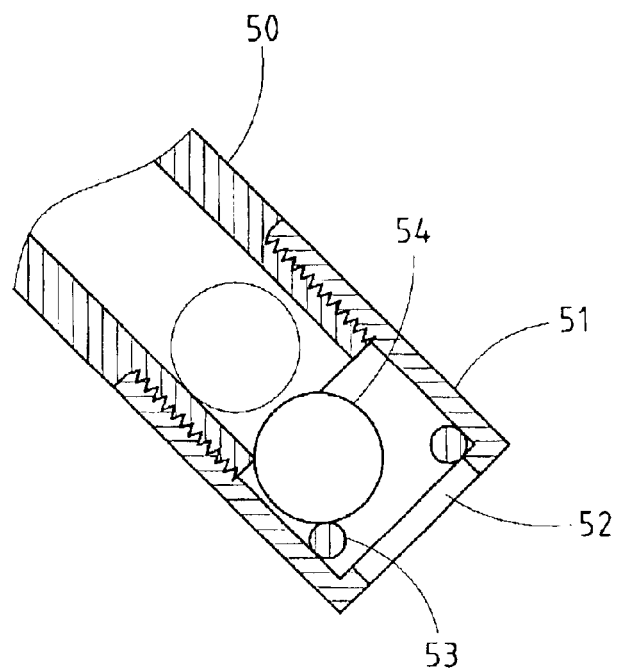
FIG. 9 shows a longitudinal sectional view of a tapping part of the spout structure of a prior art pet fountain at work.
Figure 10:
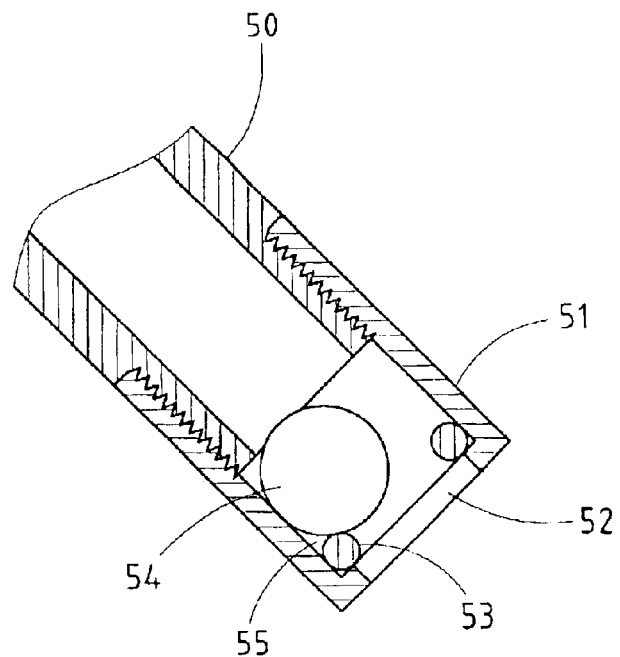
FIG. 10 shows a longitudinal sectional view of a tapping part of the spout structure of another prior art pet fountain at work.
Figure 11:
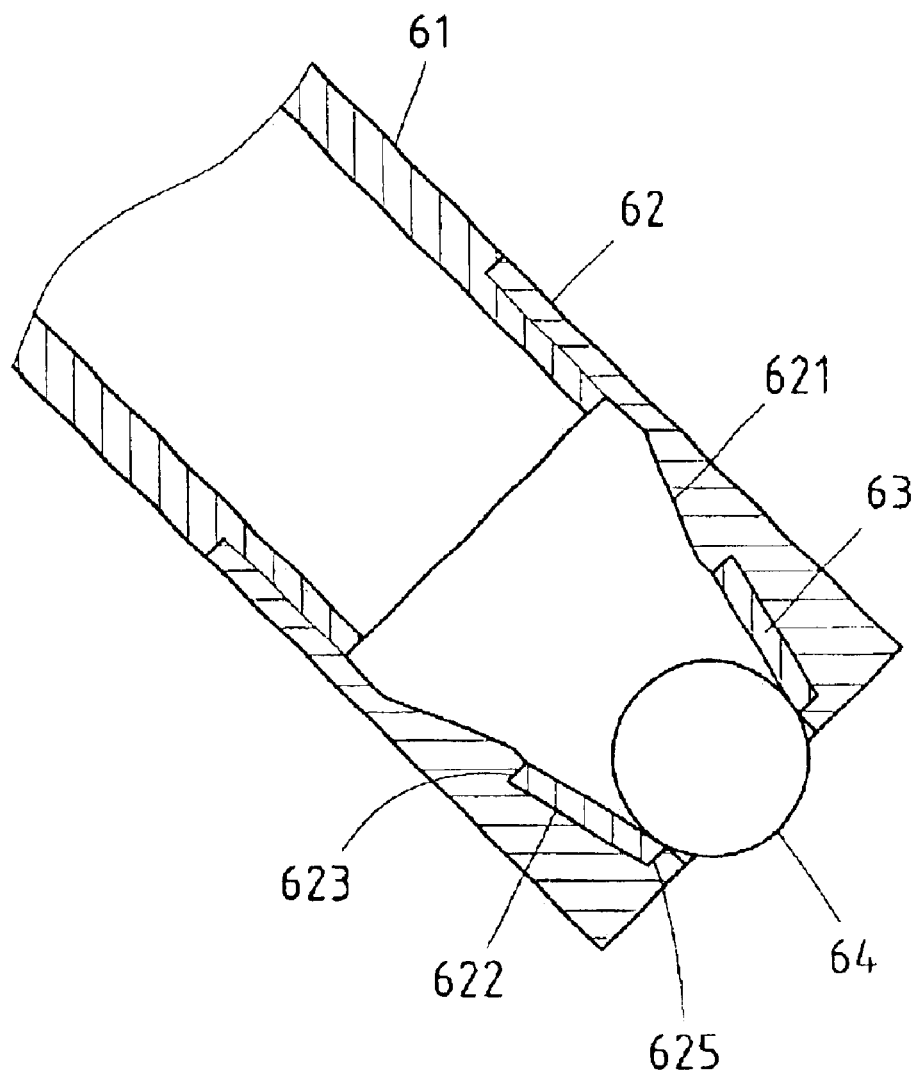
FIG. 11 shows a longitudinal sectional view of a tapping part of the spout structure of still another prior art pet fountain.

As shown in FIGS. 7 and 8, the guide edges 22 and 220 are different in height. The guide edge 22 has a height H1, while the guide edge 220 has a height H2 greater than H1. In light of the guide edge 22 being relatively shorter, the steel ball 30 has to move through a relatively shorter distance into the steel ball space 21, thereby resulting in formation of a relatively large gap "A1" between the inner wall of the steel ball space 21 and the steel ball 30, as shown in FIG. 7. As a result, a greater flow of water "W1" is let out by the tap 20. On the other hand, the guide edge 220, as shown in FIG. 8, has a height "H2" greater than the height "H1" of the guide edge 22. When the steel ball 30 is licked by a pet, the steel ball 30 has a greater distance to travel to the steel ball space 21, thereby resulting in formation of a gap "A2" which is smaller that the gap "A1 ". As a result, a smaller flow of water "W2" is let out by the tap 200, as illustrated in FIG. 8. The tap 20, as shown in FIG. 7, is intended for a large pet, while the tap 200, as shown in FIG. 8, is intended for a small pet.

The height "H1" or "H2" is defined as a distance from a bottom of the guide edge 22 or 220 to a top of the guide edge 22 or 220, with the bottom being proximal to the groove 23, and with the top being proximal to the steel ball space 21.

The embodiments of the present invention described above are to be regarded in all respects as being illustrative and nonrestrictive. Accordingly, the present invention may be embodied in other specific forms without deviating from the spirit thereof. The present invention is therefore to be limited only by the scopes of the following claims.

I claim:

1. A pet fountain comprising:

a water reservoir;

a spout projecting from said reservoir; and a tap fastened at one end to said spout and provided at another end with an opening via which a flow of water is discharged, said tap provided in an interior with a steel ball space in communication with said spout and said opening, said tap further comprised of a groove located in proximity of said opening, and a steel ball movably disposed in said steel ball space in such a manner that said steel ball is partially exposed through said opening, and such that said steel ball comes in contact with a washer which is retained in said groove;

wherein said tap is provided in the interior with a guide edge located between a bottom end of said steel ball space and said groove whereby said guide edge is used to prevent said steel ball from being inseparably arrested by said washer, so as to enable said steel ball to be moved freely away from said washer by an external force.

2. The pet fountain as defined in claim 1, wherein said guide edge has a height whereby the height of said guide edge determines rate of flow of water which is discharged via said opening of said tap, the height of said guide edge being defined as a distance from a bottom of said guide edge to a top of said guide edge, the bottom of said guide edge being proximal to said opening, and the top of said guide edge being proximal to said steel ball space.

* * * * *